United States Patent

Saito et al.

[11] Patent Number: 5,914,287
[45] Date of Patent: Jun. 22, 1999

[54] HYDROXIDE-COATED RARE EARTH OXIDE PARTICLES

[75] Inventors: Fumihiko Saito; Shigeru Sakai, both of Takefu, Japan

[73] Assignee: Shin-Etsu Chemical Co., Ltd., Tokyo, Japan

[21] Appl. No.: 08/984,187

[22] Filed: Dec. 3, 1997

[30] Foreign Application Priority Data

Dec. 6, 1996 [JP] Japan ................... 8-326700

[51] Int. Cl.$^6$ .................................. C04B 35/50
[52] U.S. Cl. ................... 501/152; 423/263; 428/403; 427/212; 427/215
[58] Field of Search ................ 501/152; 423/263, 423/657; 428/403, 404; 427/212, 215

[56] References Cited

U.S. PATENT DOCUMENTS 5,461,101  10/1995  Rothon et al. ................... 423/635
5,569,490  10/1996  Imura et al. ..................... 427/212
5,643,844   7/1997  Yasrebi et al. ................... 501/152

*Primary Examiner*—Michael Marcheschi
*Attorney, Agent, or Firm*—Dougherty & Troxell

[57] ABSTRACT

Proposed is a powder consisting of rare earth oxide-based composite particles having an average particle diameter in the range from 0.1 to 100 $\mu$m, each of which has a composite structure consisting of a core of a rare earth oxide and a coating layer of a rare earth hydroxide, the coating layer of the rare earth hydroxide having an average thickness of at least 5 nm but not exceeding 10% of the average particle diameter of the composite particles. While a rare earth oxide powder is useful as a sintering aid of a ceramic powder which is used in molding usually in the form of an aqueous slurry, the composite particles when added to an aqueous slurry of a ceramic powder exhibit a remarkable effect as a viscosity stabilizer or gelation inhibitor of the aqueous slurry so that improvements can be obtained in the productivity of the manufacturing process and quality of ceramic products.

6 Claims, No Drawings

HYDROXIDE-COATED RARE EARTH OXIDE PARTICLES

BACKGROUND OF THE INVENTION

The present invention relates to hydroxide-coated rare earth oxide particles or, more particularly, to rare earth oxide particles having a coating layer of the rare earth hydroxide having a specific thickness and useful, particularly in the form of an aqueous slurry, as the base material of a sintered body of the rare earth oxide and as a sintering aid in the manufacture of sintered ceramic bodies of various kinds of inorganic materials such as alumina, zirconia, sialon, silicon nitride, aluminum nitride and boron nitride to serve as a structural or functional element in fine technologies such as electronics.

Along with the progress in the technology of the above mentioned ceramic materials, it is a remarkable trend in recent years that use of powders of a rare earth oxide is increasing year by year as a base material of sintered ceramic body of the rare earth oxide per se or as a sintering aid in the manufacture of other ceramic materials. In these applications, the rare earth oxide powder is used in most cases in the form of a slurry prepared by dispersing the rare earth oxide powder in a suitable liquid medium using a dispersing or mixing machine such as ballmills and media mills. The liquid as the above mentioned dispersion medium can be an organic solvent or can be water but water is used increasingly as the dispersion medium in place of organic solvents in consideration of the problems relating to safety against fire and workers' health as well as environmental pollution.

One of the problems encountered in the use of a rare earth oxide powder in the form of an aqueous slurry or slip with water as the dispersion medium is stability of the rheological properties of the slurry in storage relative to the viscosity or consistency thereof. Namely, the viscosity of an aqueous slurry of a ceramic powder is a factor having great influences on the workability in the cast molding process affecting the quality such as dimensional accuracy of the molded green bodies and yield of acceptable molded bodies. The rheological properties of an aqueous slurry of a ceramic powder are also greatly influenced by the types and amounts of the dispersing agent and binder admixed to the slurry together with the base powder of the ceramic material so that the formulation of aqueous slurries must be modified depending on the molding conditions of the slurry into shaped green bodies as well as the types of the final ceramic products. In view of the large changes caused in the properties of the aqueous slurry during storage, it is not practical to prepare a large volume of an aqueous slurry of a ceramic powder at one time for storage but must be prepared in small volumes before each run of the molding process thus to greatly decrease the productivity of the ceramic molding process.

SUMMARY OF THE INVENTION

The present invention accordingly has an object to provide novel rare earth oxide-based composite particles capable of giving an aqueous slurry of the rare earth oxide-based powder per se or a powder of an inorganic ceramic material with admixture of the rare earth oxide-based powder as a sintering aid which exhibits high stability of the rheological properties or, in particular, viscosity over a long period of time for storage.

Thus, the rare earth oxide-based particles of the present invention are composite particles having an average particle diameter in the range from 0.1 to 100 μm, each of which consists of a core particle of the oxide of a rare earth element and a coating layer of the hydroxide of the rare earth element on the surface of the core particle, the coating layer of the rare earth hydroxide having a thickness of at least 5 nm but not exceeding 10% of the average particle diameter of the composite particles.

The above defined hydroxide-coated rare earth oxide particles can be advantageously prepared by a hydrothermal or hydration reaction of rare earth oxide particles with water at an elevated temperature of 80° C. or higher for at least 5 hours either in a liquid phase or in a vapor phase under normal pressure or under superatmospheric pressure.

The above described present invention is applicable to any rare earth elements including yttrium but, in particular, to the rare earth elements excluding lanthanum and neodymium because these two rare earth elements have a reactivity with water so high that a rare earth hydroxide layer having a well controlled thickness can hardly be obtained.

DETAILED DESCRIPTION OF THE PREFERRED EMBODIMENTS

As is described above, the rare earth oxide-based particles of the invention are composite particles having a specified average particle diameter and each consisting of a core particle of a rare earth oxide and a coating layer of a rare earth hydroxide having a specified thickness on the surface of the core particle.

In the present invention, the rare earth element forming the rare earth oxide and hydroxide include scandium, yttrium and any of the elements having an atomic number of 57 through 71 on the Periodic Table without particular limitations depending in the particularly intended application of the powder. The present invention, however, is applicable to the rare earth elements excluding lanthanum and neodymium due to the above mentioned reason or, namely, to the elements of scandium, yttrium, cerium, praseodymium, samarium, europium, gadolinium, terbium, dysprosium, holmium, erbium, thulium, ytterbium and lutetium. It is optional that a combination of two kinds or more of the rare earth elements jointly forms the oxide core particles and the hydroxide coating layers. It is a natural consequence of the above mentioned hydrothermal method for the formation of the rare earth hydroxide layer on the oxide core particle that the rare earth elements forming the oxide core particles and the hydroxide coating layers are the same rare earth element.

The coating layer of the rare earth hydroxide on the surface of the oxide core particles should have a thickness of at least 5 nm but not exceeding 10% of the average particle diameter of the composite particles when the powder is used in the form of an aqueous slurry having improved stability in the viscosity. When the thickness of the rare earth hydroxide coating layer is too small, the desired effect of slurry stabilization cannot be fully obtained while, when the thickness is too large, a decrease is caused in the reactivity of the composite particles to accomplish sintering of the particles if not to mention an increase in the cost for the preparation of the hydroxide-coated rare earth oxide particles.

When the intended application of the inventive composite particles is as a base material of a sintered body of the rare earth oxide or as a sintering aid of other ceramic materials, in particular, the composite particles should have an average particle diameter in the range from 0.1 to 100 μm or, preferably, from 0.1 to 50 μm or, more preferably, from 0.5 to 10 μm. When the average particle diameter of the composite particles is too large, the dispersibility of the particles in other ceramic base powders and sintering behavior of the powder are adversely affected.

The rare earth oxide-based composite particles of the present invention are prepared from a rare earth oxide powder as the starting material, preferably, having an average particle diameter in the range from 0.1 to 100 μm taking into consideration the increase in the particle diameter caused by the hydration method to form a hydroxide coating layer which, however, is very small not to exceed the measurement errors in the testing methods available. Such a rare earth oxide powder can be prepared by a known method in which a thermally decomposable rare earth compound such as oxalates, carbonates and hydroxides is calcined in an oxidizing atmosphere to be converted into the oxide powder. When the rare earth oxide particles thus obtained are too coarse or the powder contains agglomerates, it is advantageous that the coarse particles are comminuted or the agglomerates are disintegrated into fine discrete particles by using a suitable pulverizing machine or disintegrating machine such as jet mills and beads mills.

The surface of the rare earth oxide particles as the starting material can be coated by a coating layer of the rare earth hydroxide in several different methods, of which the most practical is the hydrothermal or hydration method by reacting the rare earth oxide particles with water or water vapor at an elevated temperature of 80° C. or higher. The volume of water in the reaction with liquid water is not particularly limitative provided that all of the starting rare earth oxide particles can be completely covered by the water. When the reaction temperature is higher than the boiling point of water, the reaction is performed in a pressurizable reactor, i.e. autoclave, so that the length of time taken for the formation of the hydroxide layer of a desired thickness can be greatly shortened. Needless to say, the thickness of the coating layer of the rare earth hydroxide depends on the reaction temperature and reaction time in this hydrothermal reaction. The reaction time naturally selected such that the hydroxide coating layer may have the desired thickness but is usually at least 5 hours as a rough measure. As is known, lanthanum oxide and neodymium oxide have a very high reactivity with water as compared with oxides of the other rare earth elements so that successful results can hardly be obtained when composite particles having a controlled thickness of the hydroxide coating layer are desired.

An alternative method for the formation of a coating layer of a rare earth hydroxide on the surface of rare earth oxide particles is the deposition method in which the starting rare earth oxide particles are suspended in an aqueous medium to form an aqueous slurry and the hydroxide of a rare earth element formed in situ in the aqueous medium is deposited on the surface of the oxide particles to form a coating layer of the rare earth hydroxide. In this method, the rare earth element forming the hydroxide coating layer can be different from the rare earth element forming the oxide core particles. Thus, a water-soluble salt of the rare earth element such as nitrate, chloride and sulfate is dissolved in the aqueous slurry containing the rare earth oxide particles which is then alkalinized by the addition of an alkalifying agent in an amount necessary to cause precipitation of the rare earth hydroxide so that the surface of the oxide particles is covered with the hydroxide deposited thereon. Thickness of the rare earth hydroxide coating layer can be controlled by suitably selecting the concentration of the rare earth salt in the aqueous suspending medium. The alkalifying agent can be an aqueous solution of an alkali metal hydroxide such as sodium hydroxide and potassium hydroxide as well as ammonia water and ammonia gas.

Of the above described two methods, the hydrothermal or hydration method is preferred to the deposition method in respect of the uniformity of the coating layer of the rare earth hydroxide.

The advantage obtained with the hydroxide-coated rare earth oxide particles of the invention is most remarkable when the powder is used in the form of an aqueous slurry of the powder per se or as an additive to an aqueous slurry of another ceramic powder. The aqueous slurry is prepared by dispersing the powder of hydroxide-coated rare earth oxide particles either alone or as an additive to another ceramic powder, such as silicon nitride and aluminum nitride, into water as the dispersing medium by using a suitable mixing machine such as ballmills, optionally, with addition of a dispersing agent such as sodium polycarboxylates, ammonium polycarboxylates and polyethylene oxides and a binder such as polyvinyl alcohol and methyl cellulose. Namely. the aqueous slurry of a ceramic powder including the inventive hydroxide-coated rare earth oxide particles is imparted with remarkable stability in the rheological properties of the slurry in storage, which is one of the most important requirements for ceramic slurries, as compared with an aqueous ceramic slurry by using conventional rare earth oxide particles which is subject to gelation during the preparation procedure thereof as a consequence of low stability of the aqueous slurry. This drawback in the conventional aqueous slurry containing rare earth oxide particles can be remedied only partly by decreasing the solid content of the slurry or by decreasing the length of time taken for the preparation thereof necessarily to cause adverse influences on the quality of the ceramic products and productivity of the process. The investigations undertaken by the inventors on the mechanism of such instability of rare earth oxide-containing aqueous slurries have led to a conclusion that the instability is presumably a consequence of the reaction between the surface of the rare earth oxide particles and the dispersing agents and/or binders mentioned above leading to an idea that this problem could be solved by modifying the nature of the surface of the rare earth oxide particles. When the hydroxide-coated rare earth oxide particles are used as a constituent of an aqueous slurry, namely, the above mentioned surface reaction is inhibited so that the aqueous slurry is kept flowable over an unexpected length of time without gelation.

Namely, an aqueous slurry prepared by using the hydroxide-coated rare earth oxide particles with optional addition of a dispersing agent can be kept flowable with little increase of the viscosity for about 30 days or even longer at 50° C. under gentle agitation when the solid content of the slurry is in the range from 10 to 50% by weight. Admixture of a water-soluble polymer such as polyvinyl alcohol and cellulose derivatives as a binder for ceramic bodies has little influence on the stability of the aqueous slurry.

In contrast to the above described stability of an aqueous slurry prepared by using the hydroxide-coated rare earth oxide particles of the invention, gelation of the aqueous slurry takes place within about 24 hours under the same conditions as described above when the aqueous slurry is prepared from conventional uncoated rare earth oxide particles having a particle diameter of 0.5 to 10 μm alone without addition of a dispersing agent or within about 1 hour when the aqueous slurry contains a dispersing agent.

The most important application field of the inventive hydroxide-coated rare earth oxide particles is as an ingredient in an aqueous slurry of a ceramic powder for molding of a green body in the production of ceramic materials in respect of the improvements in the dispersing behavior of the ceramic particles into the aqueous dispersion medium and the stability of the viscosity of the slurry. When the inventive hydroxide-coated rare earth oxide particles are used as a sintering aid of a base ceramic powder, the amount of addition of the inventive composite particles to the aqueous slurry, which has a solid content of 10 to 50% by weight, is in the range from 3 to 10 parts by weight per 100 parts by weight of the base ceramic powder so that the aqueous slurry is stable without gelation for about 30 days under gentle agitation at 50° C. though dependent on various factors. When the amount thereof is too small or too large, the aqueous slurry may be subject to accelerated gelation during storage even if the amount is suitable for a sintering aid.

Examples of the base ceramic powder, for which the inventive hydroxide-coated rare earth oxide particles are useful both as a sintering aid and as a stabilizer of the aqueous slurry of the powder include those for structural and electronic ceramic bodies such as alumina, zirconia, silicon nitride, aluminum nitride, sialon and barium titanate. The binder added to the aqueous slurry of these ceramic powders can be a water-soluble polymer such as polyvinyl alcohol and cellulose derivatives.

When a powder of the inventive hydroxide-coated rare earth oxide particles is added as a sintering aid to an aqueous slurry of another base ceramic powder in water as the dispersion medium, the hydroxyl groups of the coating layer of the rare earth hydroxide exhibit an electrostatic repulsive force against the hydroxyl groups or anions in the molecular ends of the dispersing agent and binder compounds so as to inhibit the reaction of gelation otherwise taking place between the ceramic particles and the molecules of the sintering aid and binder to accomplish stabilization of the aqueous slurry without increase in the viscosity during storage.

In the following, the hydroxide-coated rare earth oxide particles of the invention are described in more detail by way of Examples which, however, never limit the scope of the invention in any way. In the Examples below, the hydroxide-coated rare earth oxide particles were evaluated for the following items (1) to (3) by the respective testing procedures described there.

(1) Thickness of Rare Earth Hydroxide Coating Layer

The thickness could be determined by means of etching of the particle surface with argon in an X-ray photoelectron spectrometric method. The thickness of the rare earth hydroxide layer was estimated relative to the equivalent thickness of a silica layer.

(2) Diameter of Hydroxide-Coated Rare Earth Oxide Particles

The laser beam diffraction method was applied to an aqueous dispersion of the powder by using a granulometric instrument Model MICROTRACK manufactured by Leads and Northrup Co. Thus, 10 mg of the sample powder were taken in a glass beaker of 50 ml capacity and dispersed in 40 ml of a 0.2% by weight aqueous solution of sodium hexametaphosphate with application of ultrasonic waves from an ultrasonic homogenizer of 40 watts output for 3 minutes. Measurements were undertaken according to the procedure described in the directory manual of the instrument.

(3) Stability of Viscosity of Aqueous Slurry

An aqueous slurry of the particles in water with admixture of a dispersing agent was prepared in the formulation given in the Examples and kept standing at 50° C. to be periodically examined by visual inspection to record the length of time taken for disappearance of flowability in the whole volume of the slurry due to gelation.

EXAMPLE 1

A glass beaker was charged with 1.0 kg of a powder of yttrium oxide having an average particle diameter of 1.0 $\mu$m and 2.0 kg of deionized water to form an aqueous dispersion by agitation and the beaker sealed to prevent evaporation of water was put into an oven controlled at 90° C. and kept there for 24 hours. After cooling, the particles in the aqueous mixture were collected by filtration and dried to give yttrium hydroxide-coated yttrium oxide particles of which the coating layer had an average thickness of 20 nm as determined by the X-ray photoelectron spectrometric method.

An aqueous slurry was prepared by thoroughly agitating a mixture of 32 parts by weight of the above prepared hydroxide-coated yttrium oxide particles and 1.5 parts by weight of ammonium polyacrylate (CELLUNA D305, a product by Chukyo Yushi Co.) as a dispersing agent in 40 parts by weight of water. The aqueous slurry was subjected to an accelerated test of viscosity stabilization by keeping it at 50° C. with gentle agitation and visually inspected to find that the flowable condition of the aqueous slurry was retained even after 10 days.

The same stability test of an aqueous slurry as described above was undertaken excepting for omission of the dispersing agent in the preparation of the aqueous slurry to find that flowability of the aqueous slurry was retained after 30 days.

A further aqueous slurry of a 50% by weight solid content was prepared by dispersing a powder blend of the above prepared hydroxide-coated yttrium oxide particles and zirconia particles having an average particle diameter of 5 $\mu$m in a weight ratio of 5:100. This aqueous slurry was subjected to the stability test under the same testing conditions as above to find that the slurry retained flowability over 30 days.

EXAMPLE 2

A tray filled with 1.0 kg of a powder of yttrium oxide having an average particle diameter of 1.0 $\mu$m was put into an autoclave and the powder was heated therein for 7 hours at 120° C. in an atmosphere of saturated water vapor at this temperature. After cooling, the powder was taken out of the autoclave and dried to give yttrium hydroxide-coated yttrium oxide particles of which the hydroxide coating layer had an average thickness of 10 nm as determined by the X-ray photoelectron spectrometric method.

This powder of hydroxide-coated yttrium oxide particles was subjected to the stability test of an aqueous slurry under the same conditions as in Example 1 to find that the aqueous slurry retained the flowable condition for 5 days.

EXAMPLE 3

A glass beaker was charged with 1.0 kg of a powder of dysprosium oxide having an average particle diameter of 1.5 $\mu$m and 2.0 kg of deionized water to form an aqueous dispersion by agitation and the beaker sealed to prevent evaporation of water was put into an oven controlled at 90° C. and kept there for 24 hours. After cooling, the particles in the aqueous mixture were collected by filtration and dried to give dysprosium hydroxide-coated dysprosium oxide particles of which the coating layer had an average thickness or 20 nm as determined by the X-ray photoelectron spectrometric method.

This powder of hydroxide-coated dysprosium oxide particles was subjected to the stability test of an aqueous slurry under the same conditions as in Example 1 to find that the aqueous slurry retained the flowable condition for 20 days.

EXAMPLE 4

A tray filled with 1.0 kg of a powder of dysprosium oxide having an average particle diameter of 1.5 μm was put into an autoclave and the powder was heated therein for 7 hours at 120° C. in an atmosphere of saturated water vapor at this temperature. After cooling, the powder was taken out of the autoclave and dried to give dysprosium hydroxide-coated dysprosium oxide particles of which the hydroxide coating layer had an average thickness of 10 nm as determined by the X-ray photoelectron spectrometric method.

This powder of hydroxide-coated dysprosium oxide particles was subjected to the stability test of an aqueous slurry under the same conditions as in Example 1 to find that the aqueous slurry retained the flowable condition for 10 days.

Comparative Example 1

The same experimental procedure as in Example 1 was repeated except that the coating layer of the yttrium hydroxide-coated yttrium oxide particles had an average thickness of 3 nm instead of 20 nm as prepared by heating an aqueous slurry of 1 kg of the starting oxide particles in 2 kg of deionized water at 90° C. for 2 hours.

The result of the stability test of an aqueous slurry was that gelation took place in the slurry only after 1 hour at 50° C.

Comparative Example 2

The same experimental procedure as in Example 1 was repeated except that the hydroxide-coated yttrium oxide particles had an average particle diameter of 5.0 μm instead of 1.0 μm and the hydroxide coating layer had a thickness of 3 nm.

The result of the stability test of an aqueous slurry of the particles was that gelation took place in the slurry only after 2 hours at 50° C.

Comparative Example 3

The same experimental procedure as in Example 3 was repeated except that the coating layer of the dysprosium hydroxide-coated dysprosium oxide particles had an average thickness of 3 nm instead of 20 nm.

The result of the stability test of an aqueous slurry of the particles was that gelation took place in the slurry only after 24 hours at 50° C.

Comparative Example 4

The same stability test of an aqueous slurry as in Example 1 was undertaken excepting for the replacement of the hydroxide-coated yttrium oxide particles with the same amount of uncoated yttrium oxide particles having the same average particle diameter. The result of the stability test of an aqueous slurry of the particles was that gelation took place in the slurry only after 3 days at 50° C.

What is claimed is:

1. Rare earth oxide-based composite particles comprising rare earth oxide particles selected from the group consisting of scandium oxide, yttrium oxide, cerium oxide, praseodymium oxide, samarium oxide, europium oxide, gadolinium oxide, terbium oxide, dysprosium oxide, holmium oxide, erbium oxide, thulium oxide, ytterbium oxide, lutetium oxide and mixtures thereof, the particles having an average particle diameter in the range from 0.1 to 100 μm, and each of the particles having a composite structure consisting of a core particle of one of the rare earth oxides and a coating layer of a rare earth hydroxide wherein the rare earth hydroxide forming the coating layer is a hydroxide of the same rare earth element as that of the rare earth oxide forming the core of the composite particles and wherein the coating layer of the rare earth hydroxide has an average thickness of at least 5 nm but not exceeding 10% of the average particle diameter of the composite particles.

2. The rare earth oxide-based composite particles as claimed in claim 1 in which the average particle diameter of the composite particles is in the range from 0.1 to 50 μm.

3. The rare earth oxide-based composite particles as claimed in claim 2 in which the average particle diameter of the composite particles is in the range from 0.5 to 10 μm.

4. A method for the preparation of rare earth oxide-based composite particles having an average particle diameter in the range from 0.1 μm to 100 μm, each of the particles having a composite structure consisting of a core particle of a rare earth oxide excluding lanthanum and neodymium oxides and a coating layer of a rare earth hydroxide which comprises the step of: bringing particles of a rare earth oxide excluding lanthanum and neodymium oxides into contact with water either in liquid form or in the form of water vapor at a temperature of 80° C. or higher for at least five hours.

5. An aqueous slurry of a ceramic powder dispersed in an aqueous dispersion medium which comprises:
    (a) particles of a ceramic material; and
    (b) rare earth oxide-based composite particles having an average particle diameter in the range from 0.1 to 100 μm, each of the particles having a composite structure consisting of a core of a rare earth oxide excluding lanthanum and neodymium oxides and a coating layer of a rare earth hydroxide wherein the rare earth hydroxide forming the coating layer is a hydroxide of the same rare earth element as that of the rare earth oxide forming the core of the composite particles and wherein the coating layer of the rare earth hydroxide has an average thickness of at least 5 nm but not exceeding 10% of the average particle diameter of the composite particles, the amount of component (b) being in the range from 3 to 10 parts by weight per 100 parts of component (a).

6. An aqueous slurry of a ceramic powder dispersed in an aqueous dispersion medium in accordance with claim 5 in which the ceramic material is selected from the group consisting of alumina, zirconia, silicon nitride, aluminum nitride, sialon and barium titanate.

* * * * *